(12) United States Patent
Tarczal et al.

(10) Patent No.: US 12,153,998 B2
(45) Date of Patent: Nov. 26, 2024

(54) TAG FOR IDENTIFYING A PACKAGE AND A METHOD THEREOF

(71) Applicant: Tetra Laval Holdings & Finance S.A., Pully (CH)

(72) Inventors: Ferenc Tarczal, Lund (SE); Steed Styles, Nyköping (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 18/257,843

(22) PCT Filed: Nov. 23, 2021

(86) PCT No.: PCT/EP2021/082678
§ 371 (c)(1),
(2) Date: Jun. 15, 2023

(87) PCT Pub. No.: WO2022/128364
PCT Pub. Date: Jun. 23, 2022

(65) Prior Publication Data
US 2024/0054304 A1   Feb. 15, 2024

(30) Foreign Application Priority Data

Dec. 18, 2020 (EP) .................................... 20215615

(51) Int. Cl.
*G06K 7/14*     (2006.01)
*G06K 19/06*    (2006.01)
*G06Q 10/08*    (2024.01)

(52) U.S. Cl.
CPC .......... *G06K 7/1417* (2013.01); *G06Q 10/08* (2013.01); *G06K 19/06037* (2013.01)

(58) Field of Classification Search
CPC ............. G06Q 10/0833; G06K 7/1417; G06K 19/06037
USPC ...................................................... 235/462.1
See application file for complete search history.

(56) References Cited

U.S. PATENT DOCUMENTS 9,319,838 B1 *   4/2016   Cronin .................. G06F 16/248
9,858,583 B2 *   1/2018   Sobalvarro ............. H04W 4/80
2010/0220364 A1* 9/2010   Picard .................. H04N 1/0087
                                                       358/3.28

FOREIGN PATENT DOCUMENTS

WO   WO 2014/126654 A1   8/2014

OTHER PUBLICATIONS

International Search Report and Written Opinion for PCT/EP2021/082678 mailed on Feb. 9, 2022 in 12 pages.

* cited by examiner

*Primary Examiner* — Toan C Ly
(74) *Attorney, Agent, or Firm* — Knobbe, Martens, Olson & Bear, LLP (57) ABSTRACT

A method for uniquely identifying a food package provided with a two-dimensional, 2D, code. The method includes: capturing image data depicting the 2D code using a camera-equipped device; identifying a primary code based on the image data using a software application executed on a data processing device provided in the camera-equipped device, wherein the primary code is linked to a web address; downloading interstitial content from a remote server; launching the interstitial content linked to the primary code; and identifying a secondary code using the interstitial content, wherein the secondary code is related to individual deviations of the 2D code on the food package.

20 Claims, 8 Drawing Sheets

TAG FOR IDENTIFYING A PACKAGE AND A METHOD THEREOF

TECHNICAL FIELD

The invention is generally related to packaging technology. More particularly, it is related to a method and a camera-equipped device for uniquely identifying a food package provided with a two-dimensional (2D) code.

BACKGROUND ART

In food production today, there are strict food safety regulations to be followed to make sure that consumers are not harmed by food products. The food safety regulations are stipulating which kind of materials that are allowed to be in contact with food products, how often samples should be taken, what type of tests that should be performed in the samples, at which temperature and for how long time the food product should be heat treated in order to be considered safe to consume, and so forth. Even though the regulations are in place, frequent samples are made from the food production and several different quality controls are performed, there is from time to time nevertheless a need to recall products that have been shipped from a food production site.

Today, when the food products are recalled, distribution centers to which the food packages have been shipped are contacted. If the food packages have been transported from the distribution centers to stores, the distribution centers are in turn contacting the stores. In the event that the food products have reached store shelves and have been sold to consumers before a decision to recall the food product has been made, newspaper and other media may be used for informing the consumers that the food products may be harmful and therefore should not to be consumed.

When a decision to recall the food products has been made, it is advantageous if the food products can be identified in an efficient way. Further, it is advantageous if it can be identified where the packages that comprise the harmful food products are located. In order to be able to follow the packages, reliable traceability solutions are therefore today requested by food producers.

A traceability solution known today is to provide each food package with a readable tag or to print a variable 2D code on each food package such that information about the food package may be identified and stored. An operator or user may read the readable tag or the 2D code such that the package can be identified and in turn traced.

A drawback with using the readable tag is that this comprises a processor and a memory. Producing the readable tag and providing the readable tag on each food package is therefore both expensive and time consuming. A more cost-efficient solution is using the variable 2D code, i.e. package-unique printing. However, a drawback with this solution is that there is a need of using digital printing technology. The digital printing of the variable 2D code may take some time because e.g. the ink must be dry before feeding the food package to a next step in the processing line. The digital printing may not be able to run as fast as the processing line, producing the food packages. Thus, the digital printing may be a bottleneck in the processing and/or packaging line.

Based on the above, there is a need for improved identification technology of packages, especially within the food industry, such that the food products can be traced in a reliable manner without significant cost increases.

SUMMARY

It is an object of the invention to at least partly overcome one or more of the above-identified limitations of the prior art.

According to a first aspect it is provided a method for uniquely identifying a food package provided with a two-dimensional, 2D, code, the method comprising:

capturing image data depicting the 2D code using a camera-equipped device;
 identifying a primary code based on the image data using a software application executed on a data processing device provided in the camera-equipped device, wherein the primary code is linked to a web address;
 downloading interstitial content from a remote server;
 launching the interstitial content linked to the primary code; and
 identifying a secondary code using the interstitial content, wherein the secondary code is related to individual deviations of the 2D code on the food package.

The 2D code may be a static 2D code. The term "static 2D code" should be interpreted as that each code, in printing terms, are equal to the other codes printed on other food packages, wherein specifics of the printed codes are their static feature. Thus, every code may respond identically in one specific print run. The 2D code may be printed using any kind of printing technology. The 2D code may be any printable 2D code, e.g. a barcode or a quick response (QR) code or a DataMatrix code. The 2D code may be any printable 2D code that may be possible to read by using the camera-equipped device.

The primary code may be linked to a web address such that, when identifying the primary code, the camera-equipped device is referenced to this web address. The primary code may be equal to the other primary codes printed on other food packages in the same batch, and as a consequence every 2D code of the food package may refer to the same web address.

The secondary code may be related to microscopic variations in the printing processes. Thus, technically no printing technology may grant identical repeats in a print run, but every page has some minor, negligible for the product functional point of view, but detectable using high definition scanning technologies. Thus, the secondary code may relate to printing anomalies. Thereby, because each secondary code may comprise individual deviations, each secondary code may be unique. The individual deviations in the secondary code may provide for that each 2D code may have its own unique identifier that is non repeated due to the background infrastructure of using variable 2D codes. The secondary code may provide for that the unique identifying of the food package may be achieved. Put differently, since there will be minor deviations in the print, these minor deviations may be used for the purpose of being uniquely identifying the food packages. To be able to link the packages to a specific production site for traceability purposes, the 2D codes may be read in the filling machine before being distributed and stored in a reference database such that when the package is read at a later point of time this may be linked to one of the records of the reference database.

The software application may be any application that may be run on the camera-equipped device and may be able to identify the primary code.

The interstitial content may be a piece of program that may be used for identifying the secondary code. The interstitial content may be temporarily downloaded to the camera-equipped device, e.g. stored in a cache memory of the camera-equipped device and removed from this memory after a pre-determined period of time or when the device is turned off or put in an idle mode. The interstitial content may be covering a whole user interface of the camera-equipped device compared to e.g. pop-ups or banners. An advantage with the interstitial content is that this can provide for that no additional application may need to be installed on the camera-equipped device in order to be able to identify the secondary code. Thus, using the suggested approach, an ordinary QR code reader, provided of course that the primary code is the QR code, may be used for identifying the package without any need to download a specific software application. In addition to providing improved user experience, this increases the chances that the 2D codes are read, which in turn provides improved traceability and as an effect improved possibility to recall food products whenever needed.

The combination of using the primary code and the secondary code may be advantageous in that a variable code may be read out of a static 2D code. This may provide for an efficient printing where any printing technology may be used compared to when using variable 2D codes needed to be printed by using digital printing technology or other technology capable of providing package unique codes. By the possibilities of using any printing technology provides for that the printing of the 2D code may be present anywhere in a food processing system, e.g. on-site or off-site. In addition, this may provide for that no additional or new printers have to be installed in order to perform the printing of the 2D codes. Thus, no significant cost increases may be needed in order to provide the 2D codes on the food packages. An advantage achieved may be that the on-site printed variable 2D code may be replaced with the static 2D code. In addition, since the uniqueness is provided by the deviations formed by the printing as an inherent effect, there is no need to buy a plurality of variable 2D codes in order to provide for a unique identifying technology The individual deviations comprised in the secondary code enables the possibilities of using the static 2D code instead of the variable 2D code but still being able to uniquely identify the food package. An advantage with the static 2D code comprising the microscopic variations, or put differently, variations that can be read, but do not affect the reading of the primary code, is that the code may be unique even if the primary code is not. Thus, the disclosure makes efficient use of printing deviations that occurs every time.

An advantage by uniquely identify the food package is that the traceability of the food package may be improved or even made possible. An advantage with improved traceability is that, if one package sample is identified to have food safety issues, it may be possible to trace the other package samples within the same batch or other packages that may be at risk to make sure that negative effects can be avoided.

A further advantage may be that there may not be any need of an additional application installation for reading out the response. Thus, normally when a primary code and a secondary code may be read, a first application has to be installed for identifying the primary code and a second application has to be installed for identifying the secondary code, which is not necessary by using the present disclosure. This is possible because of that the interstitial content, which may be linked to the primary code, is configured to identify the secondary code. The interstitial content may enable interaction with the user without installing an additional application, additional to the software application used to identify the primary code. By using the interstitial content instead of installing the additional application, storage in the camera-equipped device as well as time spent on downloading and running additional application may be saved. By using the interstitial content instead of an additional application provides for that an improved usability may be achieved. It should be noted that the consumer interaction with the 2D code may remain unchanged compared to conventional interactions.

A yet further advantage may be that anti-counterfeit functions may be linked to the printed 2D code. Because the secondary code is a unique code, it may namely be possible to identify any counterfeit codes. An improved reliability of the consumer interaction with the 2D code may be achieved.

Once the interstitial content may be downloaded, the interstitial content may be stored in an intermediate repository.

The intermediate repository may be a computer memory used for storing working data, i.e. temporarily storying information in the camera-equipped device. The intermediate repository may be a cache memory or any other memory type suitable for storing working data in the camera-equipped device.

The method may further comprise emptying the intermediate repository after a pre-determined time period.

The method may further comprise launching an interstitial interactive content configured to interact with a user.

By the term "interstitial interactive content" may here be meant that the interstitial content may interact with the user by e.g. launching information or vouchers to the user. The information or voucher may e.g. be "Congratulations, you will get 20% discount next time you buy this food product". The information or voucher may e.g. be "Congratulations, you will get 20% discount next time you buy this food product. Press the button to activate your discount". The interstitial interactive content may be a one-way interaction with the user or a two-way interaction with the user. Further, launching the information may be used for triggering the user to read the 2D code. In other words, discounts may be the reason for the user to read the 2D code in the first place, and by doing so the 2D code can be linked to the device, which provides for that there is a possibility to contact the user in case the product held in the package is found harmful at a later stage.

This is advantageous in that it may be possible to interact with the user in an efficient and flexible way. Thus, if newspaper and other media may be used for informing the consumers that the food products may be harmful and therefore not to be consumed, the consumer may read to the 2D code and from that identify if food product in the food package may be harmful or not. The interstitial interactive content may comprise any information that may be relevant for the user.

The camera-equipped device may be a mobile phone.

Using the mobile phone as the camera-equipped device may improve the usability because almost everyone is carrying a mobile phone at almost all times. Thus, there may not be any need for carrying an addition device. However, it should be noted that other camera-equipped devices such that a tablet or a computer may be used as well.

The individual deviations may be related to printing inaccuracies.

By the term "printing inaccuracies" is here meant the opposite of printing accuracies. Put differently, if a printing accuracy may be a number of dots per inch, the printing inaccuracy may be when the printing accuracy is not fulfilled, when the number of dots per inch may be outside the printing accuracy. By having the individual deviations relating to printing inaccuracies may provide for that no additional or different printing may be needed for each food package in order to achieve a unique identifier. Thus, the printing inaccuracies may be present regardless if they may be used or not. This disclosure facilitates provision of already present deviations in the printing technology.

According to a second aspect, it is provided a camera-equipped device for uniquely identifying a food package provided with a two-dimensional, 2D, code, the camera-equipped device comprising:

a camera configured to capture image data depicting a 2D code;

a software application configured to identify a primary code based on the image data, wherein the primary code is linked to a web address;

a data communications device configured to download interstitial content from a remote server;

a data processing device configured to execute the software application and launch the interstitial content linked to the primary code, wherein the interstitial content is configured to identify a secondary code, wherein the secondary code is related to individual deviations of the 2D code on the food package.

Once the data communication device may have downloaded the interstitial content, the interstitial content may be stored in an intermediate repository.

The intermediate repository may be emptied after a predetermined time period.

The data processing device may further configured launch an interstitial interactive content configured to interact with a user.

The camera-equipped device may be a mobile phone.

The individual deviations may be related to printing inaccuracies.

According to a third aspect, it is provided a non-transitory computer-readable storage medium having stored thereon program code portions for implementing the method according to the first aspect when executed on a device having processing capabilities.

Still other objectives, features, aspects and advantages of the invention will appear from the following detailed description as well as from the drawings.

Effects and features of the second and third aspects are largely analogous to those described above in connection with the first aspect. Embodiments mentioned in relation to the first aspect are largely compatible with the second and third aspect. It is further noted that the inventive concepts relate to all possible combinations of features unless explicitly stated otherwise. A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only and is not intended to be limiting. It must be noted that, as used in the specification and the appended claim, the articles "a", "an", "the", and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

Embodiments of the invention will now be described, by way of example, with reference to the accompanying schematic drawings, in which.

DETAILED DESCRIPTION

Figure 1:
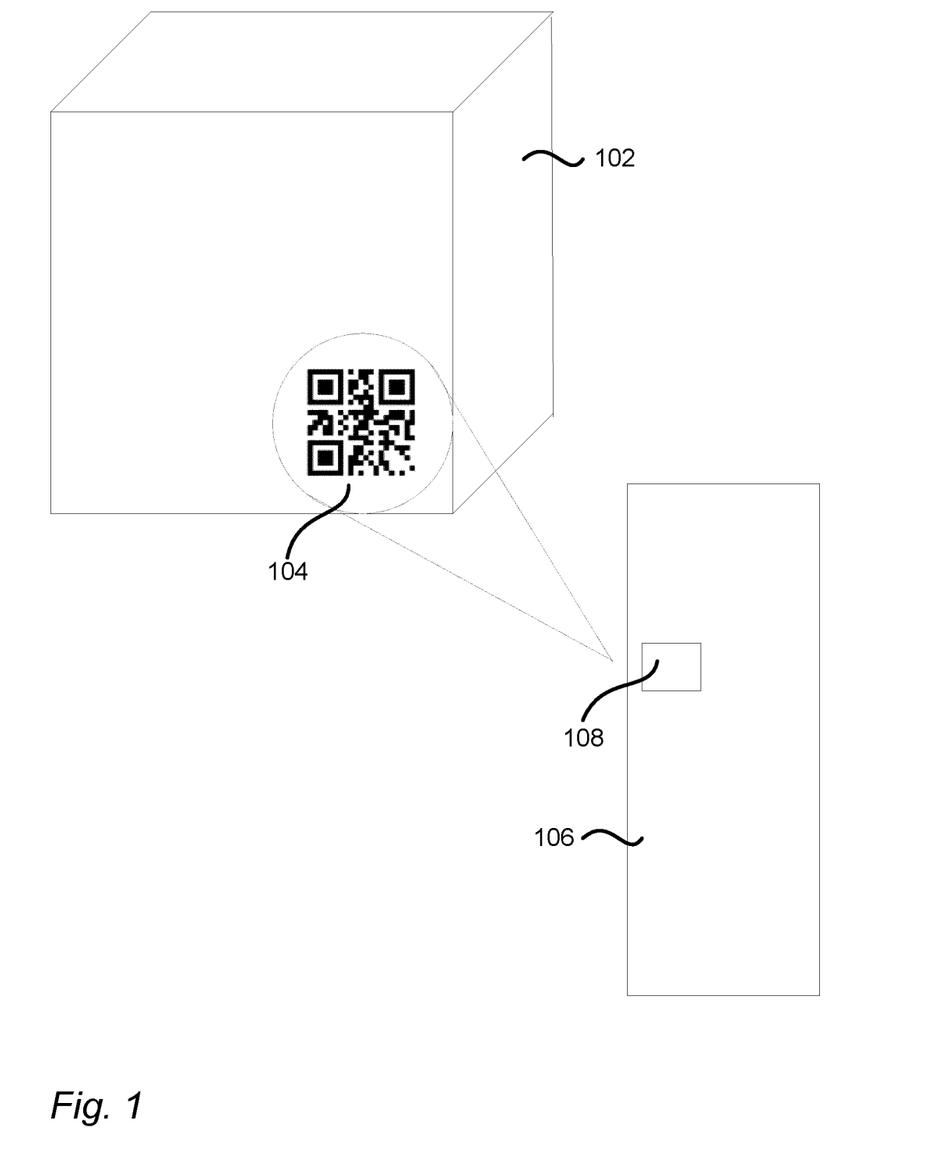
FIG. 1 illustrates a food package provided with a two-dimensional code.

FIG. 1 illustrates a food package 102 by way of example. In the illustrated example, the food package 102 is of a rectangular prism shape. However, it should be noted that the food package 102 may be of any three-dimensional shape. The food package 102 may be provided with a two-dimensional (2D) code 104. Although illustrated as a QR code, the 2D code 104 may be any 2D code known in the art. The 2D code 104 may be provided anywhere on the food package 102. The 2D code 104 may uniquely identify the food package 102. The food package 102 may be uniquely identified by capturing image data depicting the 2D code 104 by using a camera-equipped device 106. The camera-equipped device 106 may be configured to uniquely identify the food package 102 provided with the 2D code 104. The camera-equipped device 106 may be configured to capture the image data by using a camera 108 comprised in the camera-equipped device 106. The camera 108 may be configured to capture a picture of the 2D code 104, wherein the picture may comprise the image data depicting the 2D code 104. The camera 108 may be any camera configured to be equipped within the device and to capture image data, e.g. a mobile phone camera or a computer camera. The camera-equipped device 106 will be discussed in further detail in connection with FIG. 2A-D.

FIG. 2A-D illustrates the camera-equipped device 106 for uniquely identifying the food package 102 provided with the 2D code 104 by way of example. In addition to the camera 108, the camera-equipped device 106 may comprise a software application 204. The software application 204 may be configured to identify a primary code 206 based on the image data. The image data captured by the camera 108 may be transmitted to the software application 204 such that the software application 204 may be configured to identify the primary code 206. The primary code 206 may be linked to a web address 208. The web address 208 may be a http-address, an ftp-address or an IP-address. However, it should be noted that the web address may be any Uniform Resource Locator (URL) configured to be linked to the primary code 206. The camera-equipped device 106 may further comprise a data processing device 202. The data processing device 202 may be configured to execute the software application 204.

The camera-equipped device 106 may further comprise a data communication device 210 configured to download interstitial content 212 from a remote server 214. The interstitial content 212 may be linked to the primary code 206, which, as previously discussed, may be linked to the web address 208. The interstitial content 212 may be trigged by the web address 208 to be downloaded. The remote server 214 may be any server enabled to be remote to the camera-equipped device 106.

Figure 2A:
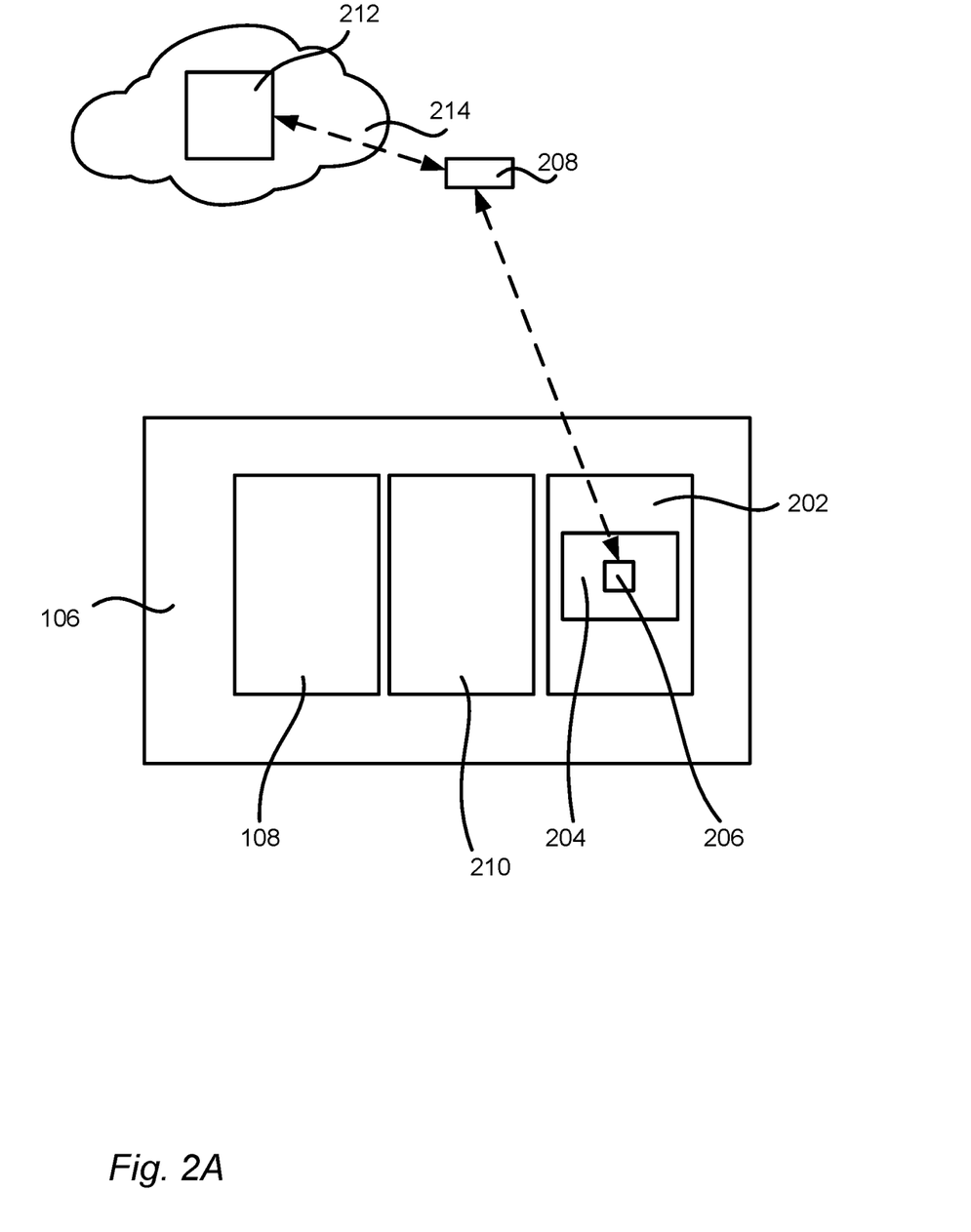
FIG. 2A-D illustrates how a primary code and a secondary code of the disclosure is identified.

With reference to FIG. 2A, a link between the primary code 206, identified by the software application 204, and the web address 208 and a link between the web address 208 and the interstitial content 212 are illustrated by way of example. The link between the primary code 206 and the web address 208 is illustrated by a dotted line to indicate that the primary code 206 and the web address 208 may be linked to each other, but that no data may be downloaded, or uploaded, between the primary code 206 and the web address 208. Thus, when the software application 204 may identify the primary code 206, the primary code 206 may trigger the linked web address 208 to run. The link between the web address 208 and the interstitial content 212 is illustrated by a dotted line to indicate that the interstitial content 212 may be trigged by the web address to run, but that no data may be downloaded, or uploaded, between the web address 208 and the interstitial content 212. Thus, the dotted lines may indicate that communications between the primary code 206 and the web address 208 and between the web address 208 and the interstitial content 212 may be established, wherein the communication may not include downloading or uploading any data therebetween.

Figure 2B:
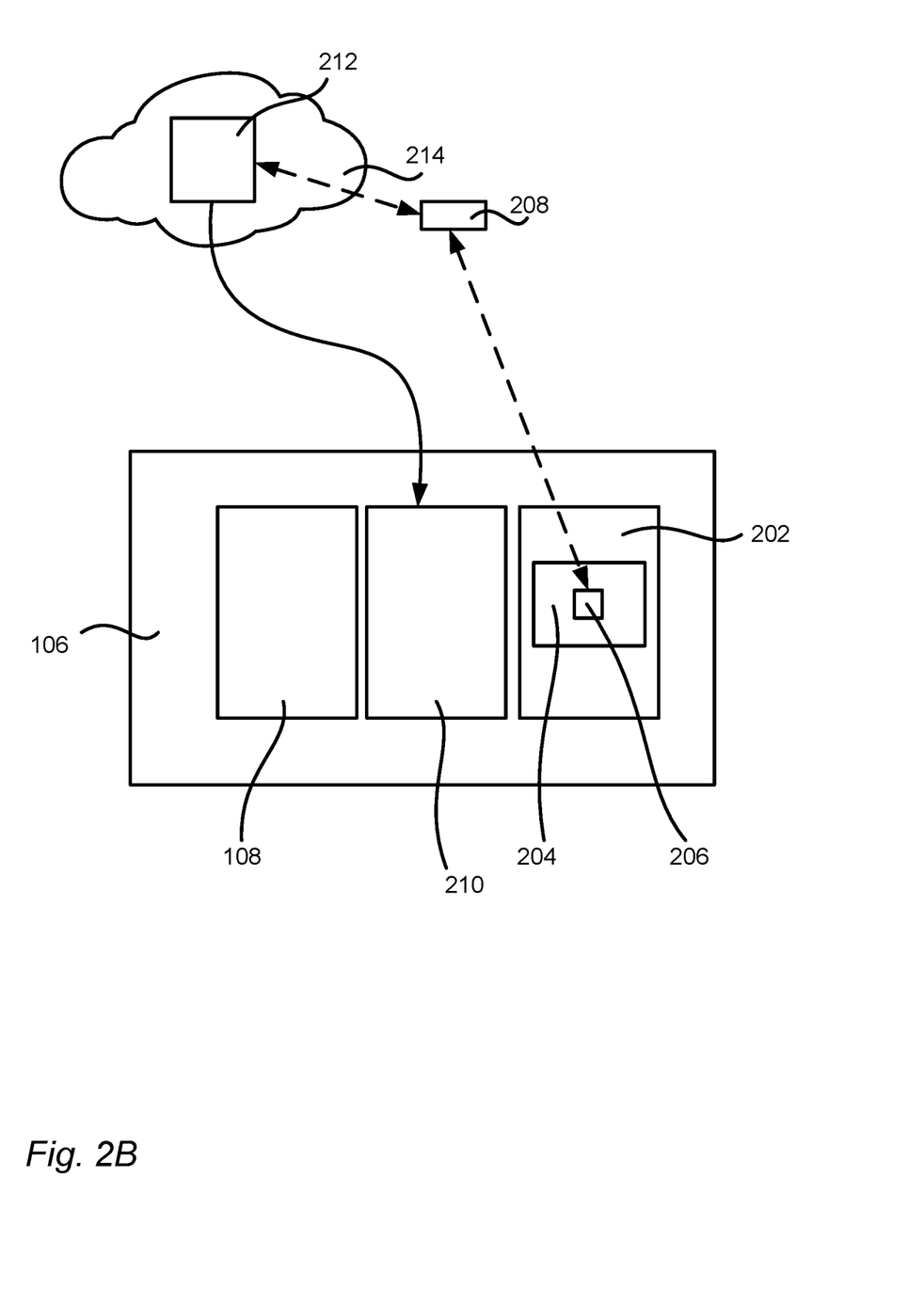

With reference to FIG. 2B, a link between the interstitial content 212 and the data communication device 210 are illustrated by way of example. The link between the interstitial content 212 and the data communication device 210 is illustrated by a solid line to indicate that the data communication device 210 may be configured to download the interstitial content 212 to the camera-equipped device 106. However, it should be noted, which is understood from the term "interstitial content", that the interstitial content may only be temporarily downloaded, or downloaded for a pre-determined time period. Once the interstitial content may have been downloaded, the interstitial content may be stored in an intermediate repository. The intermediate repository may for instance be the cache memory or any memory configured to temporarily store data. The interstitial content 212 may be stored in the intermediate repository for a pre-determined time period.

When the interstitial content 212 has been downloaded by the data communication device 210 to the camera-equipped device 106, it may be launched by the data processing device 202. The image data captured by the camera 108 may be transmitted to the interstitial content 212, once the interstitial content 212 is launched by the data processing device 202 the interstitial content 212 can identify a secondary code 216 based on the image data. The secondary code 216 may relate to individual deviations of the 2D code 104. The food package 102 provided with the 2D code 104 may be uniquely identified because of the individual deviations that the secondary code 216 may relate to. However, it should be noted that the primary code 206 and/or the secondary code 216 may not be transmitted outside the camera-equipped device 106 but between components comprised in the camera-equipped device 106.

The data processing device 202 may further be configured to launch an interstitial interactive content. The interstitial interactive content may be launched in the similar way as the interstitial content 212 previously discussed. The interstitial interactive content may be configured to interact with a user, e.g. the user of the camera-equipped device 106. The interstitial interactive content may e.g. interact with the user by asking questions, provide different boxes to be ticked in in order to win something or to get discount next time the user is buying a similar food package or the like. It may also be presented production information, for instance nutritional value and/or where the food product originates from. The interactive interstitial content may also, based on the secondary code 216, be able to inform the user if a food product in the food package 102 may be harmful or if the user should avoid eating or drinking the food product for any other reason. Thus, the interstitial interactive content may be a link between a producer of the food package 102 or the food product and the user or a consumer.

Figure 2C:
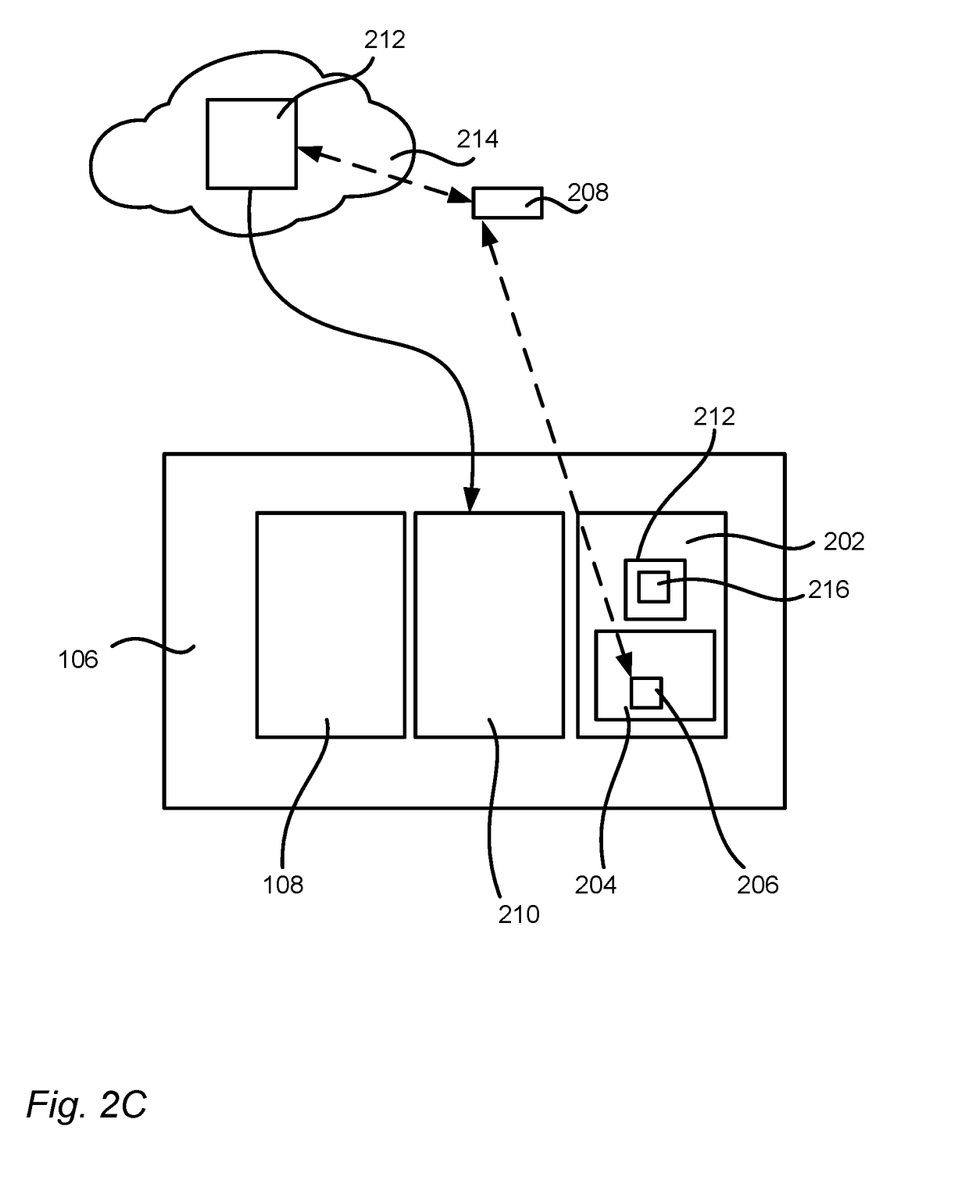

With reference to FIG. 2C, it is illustrated how the interstitial content 212 may be launched by the data processing device 202 by way of example. It is further illustrated the secondary code 216 which may have been identified by the interstitial content 212. Thus, when the interstitial content 212 may have been downloaded by the data communication device 210, the interstitial content 212 may be transmitted from the data communication device 210 to the data processing device 202, wherein the interstitial content 212 may be launched.

It should be noted that the image data depicting the 2D code 104 have only been captured once, and the primary code 206 and the secondary code 216 may have been identified from the same image data. It should further be noted that the interstitial content 212 may not need to be installed on the camera-equipped device in order to identify the secondary code 216 but may only be downloaded for a pre-determined time period such that the secondary code 216 may be identified and a result relating to the secondary code 216 may be present.

Figure 2D:
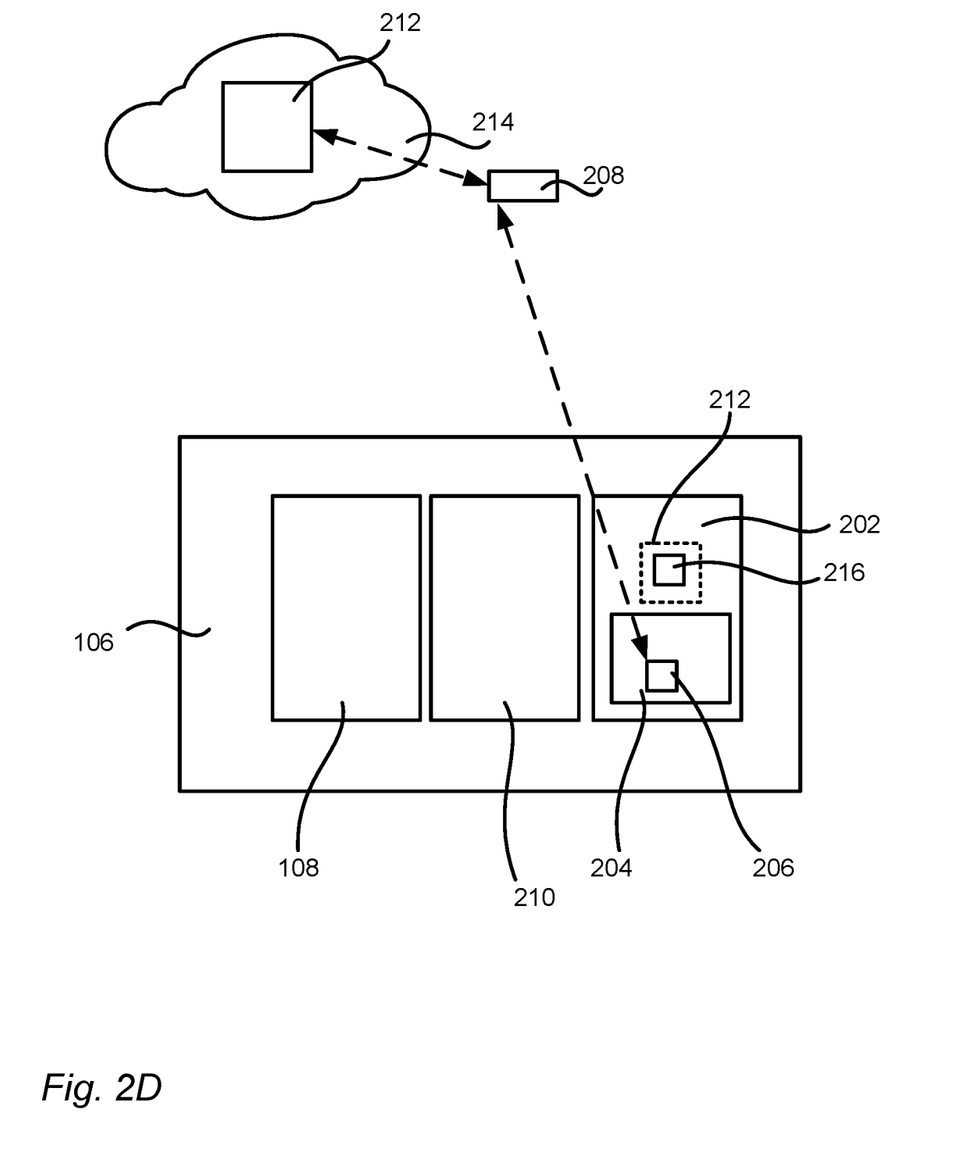

With reference to FIG. 2D, the solid line between the interstitial content 212 and the data communication device 210 has been deleted. This may indicate that the interstitial content 212 may not be downloaded to the data communication device 210. The interstitial content 212 launched by the data processing device 202 is illustrated with a dotted line, wherein the dots are smaller than the dots in the dotted lines between the primary code 206 and the web address as well as between the web address and the interstitial content 212. The smaller dots may indicate that the interstitial content 216 may have been removed or may not be launched by the data processing device 202 anymore. Thus, in FIG. 1D, the link between the primary code 206 and the web address 208 and the link between the web address and the interstitial content 216 may be identified. Further, the downloading of the interstitial content 212 to the data communication device 210 may be stopped and the interstitial content 212 may have be removed from the data processing device 202, which the small dotted line indicates. Thus, as illustrated, the interstitial content 212 may be deleted once the secondary code 216 has been determined.

Figure 3:
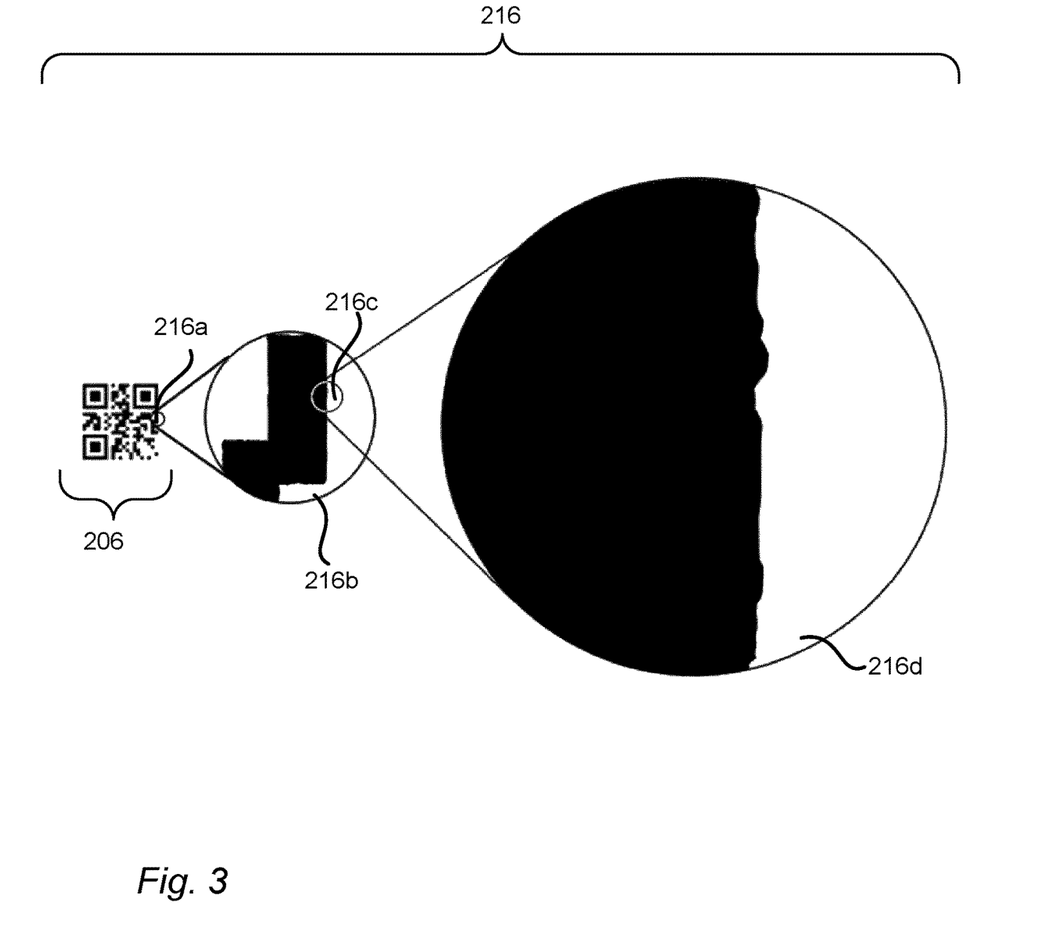
FIG. 3 illustrates a primary code and a secondary code.

FIG. 3 illustrates the primary code 206 and the secondary code 216, by way of example, in further detail. The primary code 206 and the secondary 216 may be based on the image data, wherein the image data may be depicting the 2D code 104. In FIG. 3, the 2D code 104 is illustrated as a QR code. However, it should be noted, as previously discussed, that the 2D code 104 may be any 2D code known in the art and configured to be captured by using the camera-equipped device 106.

The primary code 206 may be the 2D code 104 which may be seen by the naked eye without any need of high definition scanning technology. However, the software application 204, or the like, may be needed in order to read the 2D code 104, but not to see the 2D code 104.

The secondary code 216 may be based on individual deviations of the 2D code 104. The individual deviations may not be seen by the naked eye but may be identifiable if using the high definition scanning technology, which the camera-equipped device 106 may comprise.

The primary code 206 may comprise a first area 216a. A zoomed in version 216b of the first area 216a may illustrate the part of the primary code 206 comprised in the first area 216a in a more detailed view. The zoomed in version 216b of the first area 216a may comprise a second area 216c. A zoomed in version 216d of the second area 216c may illustrate the part of the primary code 206 comprised in the first area 216a in a more detailed view. In the zoomed in version 216d of the second area 216c, the individual deviations that the secondary code 216 may be based on may be seen. The individual deviations may be based on, or relate to, printing inaccuracies which more of less always occurs within printing technology. The individual deviations may be unique for each printed 2D code 104 such that each secondary code 216 may be a unique code for uniquely identify the food package 102.

Figure 4:
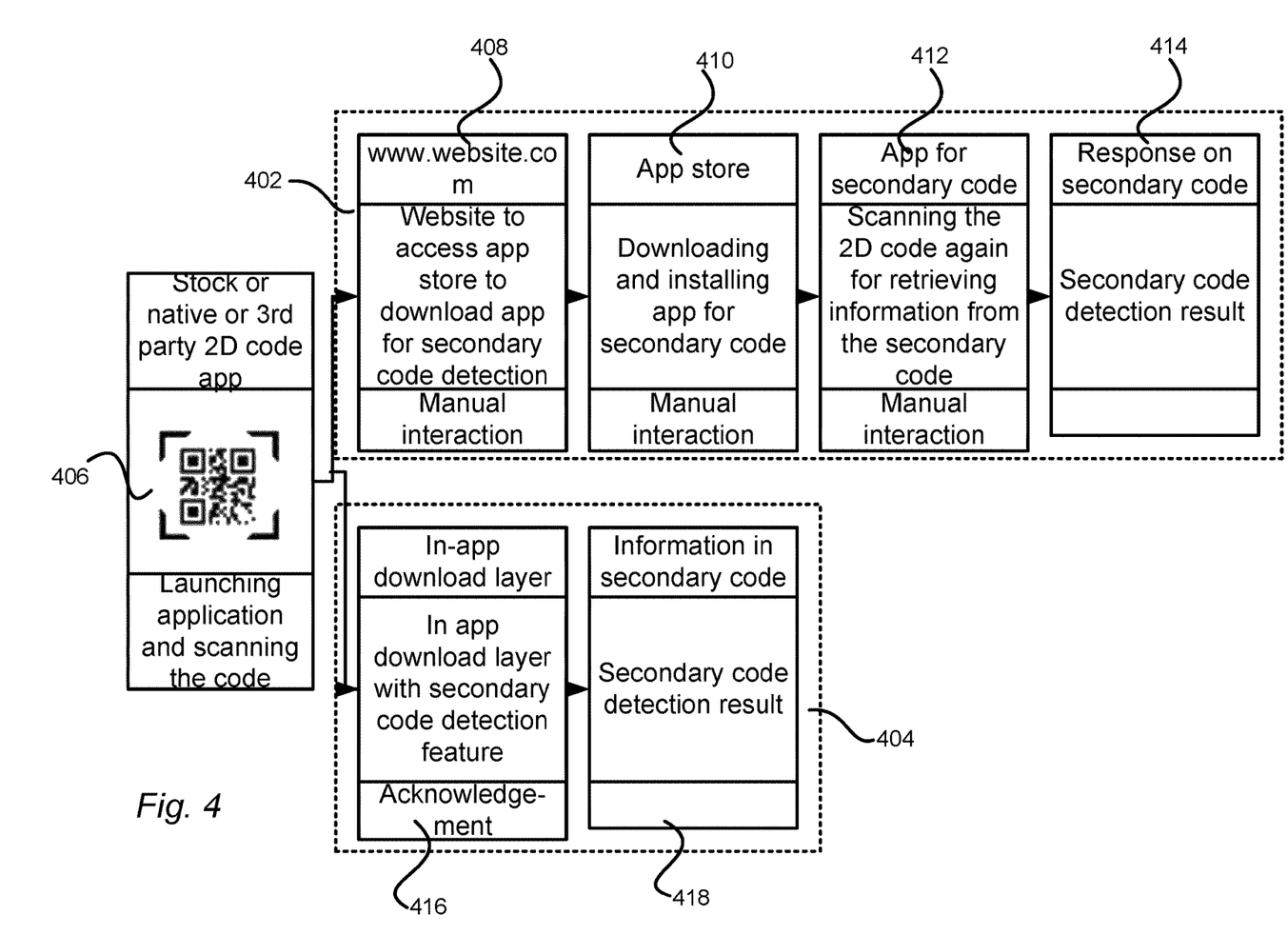
FIG. 4 illustrates a conventional route for reading a secondary code and a route of the present disclosure for reading the secondary code.

FIG. 4 illustrates a conventional route 402 for reading the secondary code as well as a disclosed route 404 for reading the secondary code 404. The conventional route 402 comprises a track with straight links to websites. The disclosed route 404 may comprise a customized shortcut track with in-app access to secondary level code.

A first step 406 of both the conventional route 402 and the disclosed route 404 may comprise launching application and scanning a code. The application may be a stock, native or 3$^{rd}$ party 2D code.

In a second step 408 of the conventional route 402, the user may be directed to a website to access app store to download an additional app to be able to read the secondary code. Put differently, the conventional route 402 needs to download an additional app to be able to read the secondary code. In a third step 410 of the conventional route 402, the app for reading the secondary code may be downloaded and installed on the user device, e.g. the camera-equipped device 106. In a fourth step 412 of the conventional route 402, the consumer may scan the 2D code again for retrieving information from the secondary code. The second, third and fourth step 408, 410, 412 may provide manual interaction. As a final step 414 of the conventional route 402, a secondary code detection result may be shown. Thus, by using the conventional route 402, the code has to be read twice as well as an additional application has to be installed on the device.

The disclosed route 404, on the other hand, may, after the first step 406, wherein the application may have been launched and the code scanned, provide a second step 416 in which an in-app download layer with secondary code detection features may be downloaded. The in-app download layer may be temporarily download which has been discussed above in connection with FIG. 2A-D. Thereafter, as a final step 418 of the disclosed route 404, a secondary code detection result may be presented. Thus, by using the disclosed route 404, the code may only need to be read once as well as no additional application may need to be installed, but the in-app download layer may be used instead.

Figure 5:
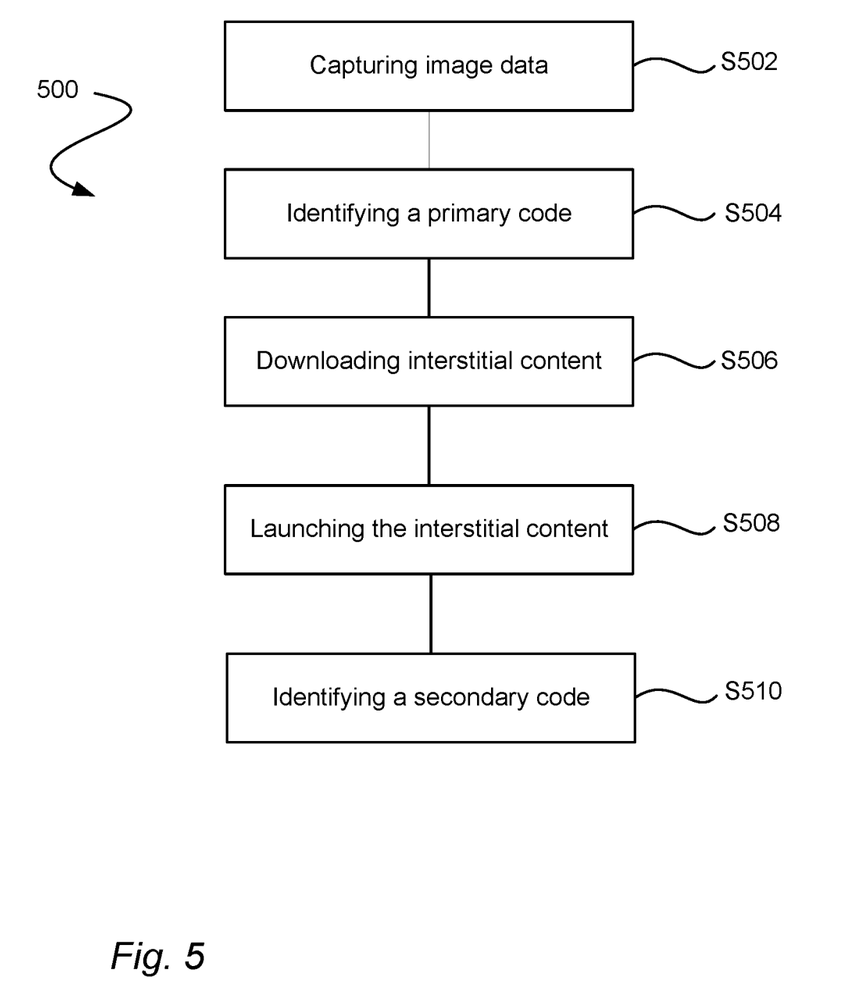
FIG. 5 is a flow chart illustrating a method for uniquely identifying a food package provided with a two-dimensional 2D code.

In FIG. 5 it is presented a flow chart illustrating a method 500 for uniquely identify the food package provided with the 2D code.

In a first step S502, image data depicting the 2D code 104 may be captured by using a camera-equipped device 106. The camera-equipped device 106 may be a mobile phone.

In a second step S504, a primary code 206 based on the image data may be identified by using a software application 204. The software application 204 may be executed on a data processing device 202 provided in the camera-equipped device 106. The primary code 206 may be linked to a web address 208.

In a third step S506, interstitial content 212 may be downloaded from a remote server 214. The interstitial content 212, once downloaded, may be stored in an intermediate repository. The intermediate repository may be emptied after a pre-determined time period.

In a fourth step S508, the interstitial content 212 may be launched. The interstitial content may be launched by the data processing device 202. The interstitial content 212 may be linked to the primary code 206.

In a fifth step S510, a secondary code 216 may be identified using the interstitial content 212. The secondary code 216 may be related to individual deviations of the 2D code on the food package. The individual deviations may be related to printing inaccuracies.

Optionally, the method 500 may comprise launching an interstitial interactive content configured to interact with a user. The interstitial interactive content may be launched by the data processing device 202.

From the description above follows that, although various embodiments of the invention have been described and shown, the invention is not restricted thereto, but may also be embodied in other ways within the scope of the subject-matter defined in the following claims.

The invention claimed is:

1. A method for uniquely identifying a food package provided with a static two-dimensional (2D) code, the method comprising:
   capturing image data depicting the static 2D code using a camera-equipped device, the static 2D code comprising a primary code associated with a group of food packages and a unique secondary code associated with a particular food package of the group of food packages;
   identifying the primary code based on the image data using a software application executed on a data processing device provided in the camera-equipped device;
   downloading interstitial content linked to the primary code from a remote server;
   and
   identifying, using the interstitial content, the unique secondary code based on the image data, wherein the unique secondary code is identified from individual deviations of the static 2D code printed on the particular food package.

2. The method according to claim 1, wherein, once downloaded, the interstitial content is stored in an intermediate repository.

3. The method according to claim 2, wherein the method further comprises:
   emptying the intermediate repository after a pre-determined time period.

4. The method according to claim 1, wherein the method further comprises:
   launching an interstitial interactive content configured to interact with a user.

5. The method according to claim 1, wherein the camera-equipped device is a mobile phone.

6. The method according to claim 1, wherein the individual deviations are related to printing inaccuracies.

7. A non-transitory computer-readable storage medium having stored thereon program code portions that, when executed to a processor, cause the processor to implement the method according to claim 1.

8. The method of claim 1, wherein the individual deviations are visible only by high-definition scanning technology.

9. The method according to claim 1, further comprising launching an application associated with the interstitial content linked to the primary code.

10. The method according to claim 9, wherein the application associated with the interstitial content linked to the primary code is a sole application used to identify the unique secondary code.

11. The method of claim 1, wherein the individual deviations of the static 2D code printed on the particular food package are different than other individual deviations of another static 2D code printed on another particular food package from the group of food packages so that the unique secondary code associated with the particular food package is different than another unique secondary code associated with the another particular food package.

12. A camera-equipped device for uniquely identifying a food package provided with a static two-dimensional (2D) code, the camera-equipped device comprising:
 a camera configured to capture image data depicting the static 2D code, the static 2D code comprising a primary code associated with a group of food packages and a unique secondary code associated with a particular food package of the group of food packages;
 a memory storing a software application configured to cause a data processing device to identify the primary code based on the image data; and
 a data communications device configured to download interstitial content linked to the primary code from a remote server, wherein the data processing device is configured to identify, using the interstitial content, the unique secondary code based on the image data, and wherein the unique secondary code is identified from individual deviations of the static 2D code on the particular food package.

13. The camera-equipped device according to claim 12, wherein, once the data communication device has downloaded the interstitial content, the interstitial content is stored in an intermediate repository.

14. The camera-equipped device according to claim 13, wherein the intermediate repository is emptied after a predetermined time period.

15. The camera-equipped device according to claim 12, wherein the data processing device is further configured launch an interstitial interactive content configured to interact with a user.

16. The camera-equipped device according to claim 12, wherein the camera-equipped device comprises a mobile phone.

17. The camera-equipped device according to claim 12, wherein the individual deviations are related to printing inaccuracies.

18. The camera-equipped device according to claim 12, wherein the individual deviations are visible only by high-definition scanning technology.

19. The camera-equipped device according to claim 12, wherein the data processing device is configured to launch an application associated with the interstitial content linked to the primary code.

20. The camera-equipped device according to claim 12, wherein the individual deviations of the static 2D code printed on the particular food package are different than other individual deviations of another static 2D code printed on another particular food package from the group of food packages so that the unique secondary code associated with the particular food package is different than another unique secondary code associated with the another particular food package.

* * * * *